United States Patent [19]
Bourns et al.

[11] Patent Number: 5,690,979
[45] Date of Patent: Nov. 25, 1997

[54] METHOD OF PREPARING REDUCED FAT MICROWAVE POPCORN

[75] Inventors: Tricia J. Bourns, St. Louis Park; Brian E. Glass, Brooklyn Park; Timothy J. Gluszak, Maple Grove; Myron M. Uecker, Buffalo, all of Minn.

[73] Assignee: General Mills, Inc., Minneapolis, Minn.

[21] Appl. No.: 402,276

[22] Filed: Mar. 10, 1995

Related U.S. Application Data

[62] Division of Ser. No. 86,607, Jul. 2, 1993, abandoned.

[51] Int. Cl.$^6$ .................................................. A23L 1/18
[52] U.S. Cl. ........................... 426/307; 53/431; 426/93; 426/102; 426/107; 426/113; 426/309; 426/413
[58] Field of Search ........................... 426/93, 99, 102, 426/107, 113, 234, 302, 307, 309, 397, 410, 412, 413; 53/431; 141/10, 69, 85

[56] References Cited

U.S. PATENT DOCUMENTS

| | | |
|---|---|---|
| 2,805,639 | 9/1957 | Martin . |
| 3,882,255 | 5/1975 | Gorham, Jr. et al. . |
| 4,450,180 | 5/1984 | Watkins ........................ 426/107 |
| 4,548,826 | 10/1985 | Watkins ........................ 426/394 |
| 4,604,854 | 8/1986 | Andreas ........................ 53/552 |
| 4,735,513 | 4/1988 | Watkins et al. ............... 383/116 |
| 4,743,456 | 5/1988 | Spadafora et al. ........... 426/307 X |
| 4,751,090 | 6/1988 | Belleson et al. ............. 426/93 |
| 4,767,635 | 8/1988 | Merritt et al. ................ 426/272 |
| 4,904,487 | 2/1990 | LaBaw et al. ................ 426/107 |
| 4,904,488 | 2/1990 | LaBaw et al. ................ 426/107 |
| 4,927,645 | 5/1990 | Lee ............................... 426/93 |
| 4,973,810 | 11/1990 | Brauner ....................... 219/10.55 E |
| 5,132,125 | 7/1992 | Lew et al. .................... 426/307 X |
| 5,149,562 | 9/1992 | Hebert et al. ................. 426/632 |
| 5,361,560 | 11/1994 | Sandolo ........................ 426/410 X |

FOREIGN PATENT DOCUMENTS

| | | |
|---|---|---|
| 0 256 791 | 2/1988 | European Pat. Off. . |
| 59-146543 | 8/1984 | Japan ........................... 426/307 |
| 2 232 657 | 12/1990 | United Kingdom . |

*Primary Examiner*—Arthur L. Corbin
*Attorney, Agent, or Firm*—John A. O'Toole; L. MeRoy Lillehaugen

[57] ABSTRACT

Disclosed are microwave popcorn articles which upon microwave heating provide popcorn of reduced fat content, better fat distribution and improved taste as well as methods for the preparation of such articles. The articles comprise any conventional microwave popcorn bag and an improved popcorn/fat charge. In addition to unpopped popcorn kernels and fat, the charge further essentially includes minor amounts of salt, color and/or flavors. The present method involves the spraying of a fat/salt slurry at the same time as and at an angle to a falling cascade of unpopped popcorn kernels as they are charged to the upper open end of the microwave popcorn bag. The angle of the fat/salt spray is such as to intersect with the falling popcorn cascade within the popcorn bag below the top seal area. By applying the fat/salt slurry to a falling cascade of unpopped popcorn kernels during bag filling, improved distribution of the slurry over the popcorn is achieved. Such improved slurry distribution yields organoleptic improvements in the popped product in that fat perception is increased even at low fat levels as well as more uniform distribution of flavor, salt and color.

22 Claims, 4 Drawing Sheets

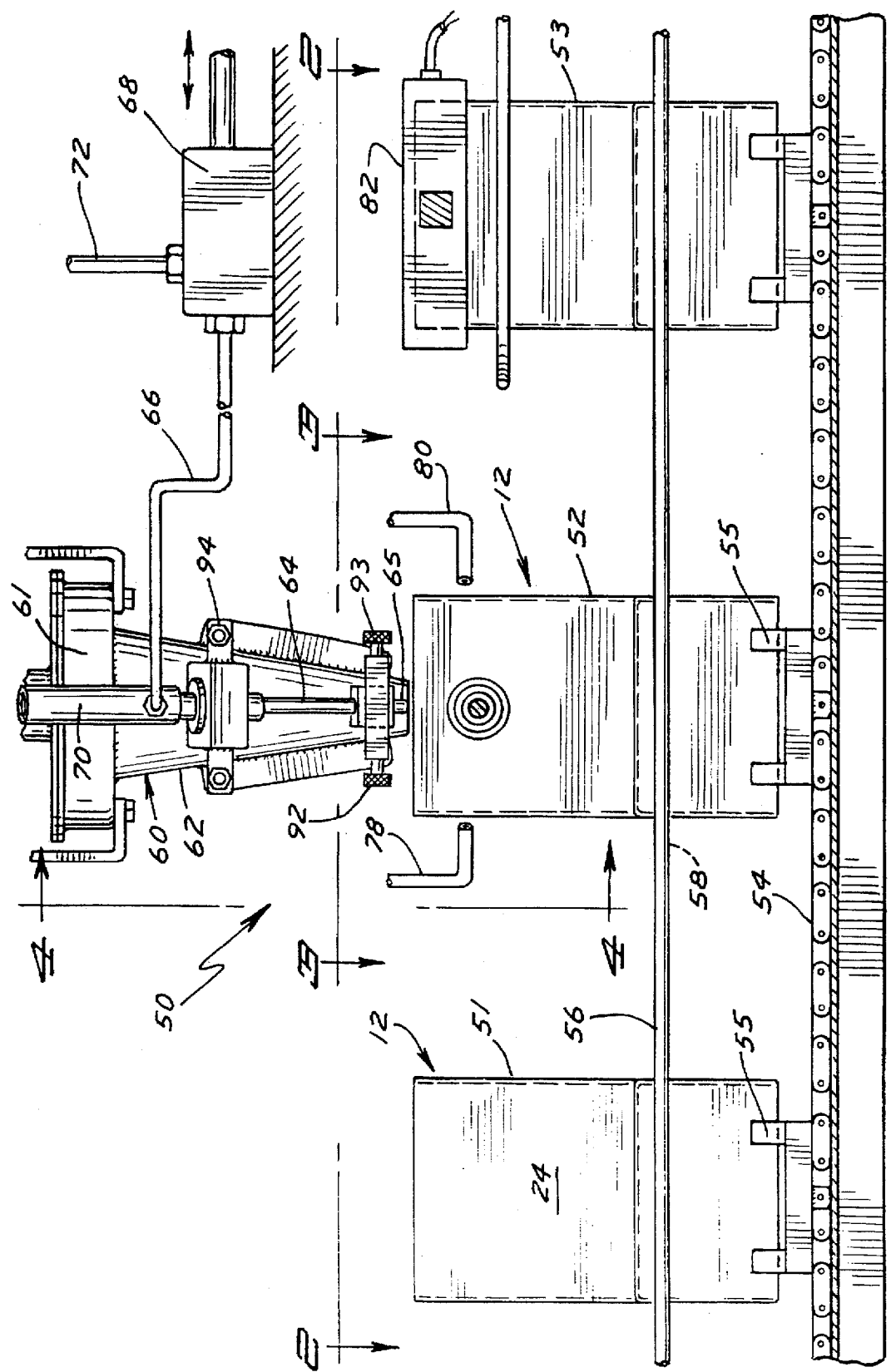

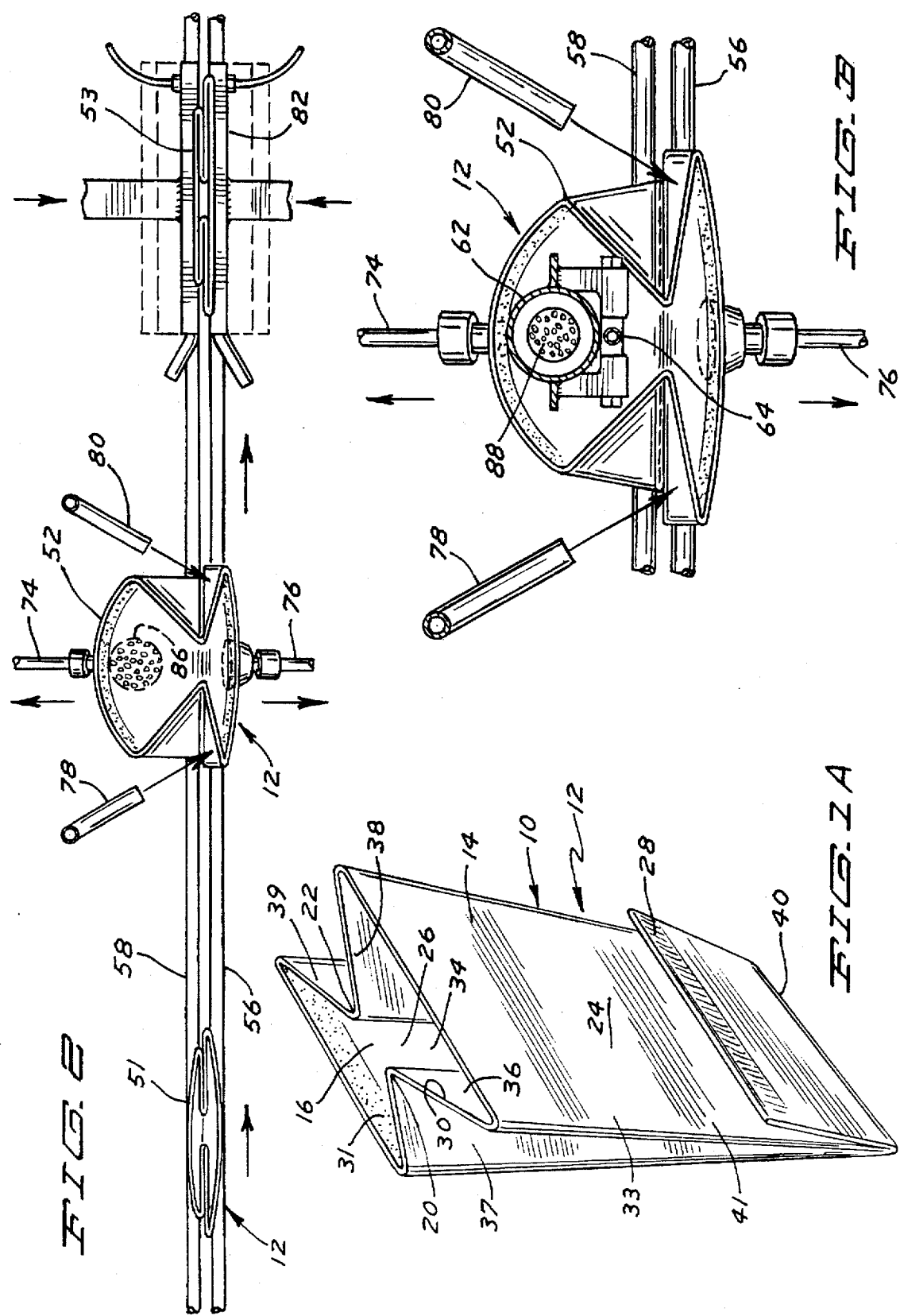

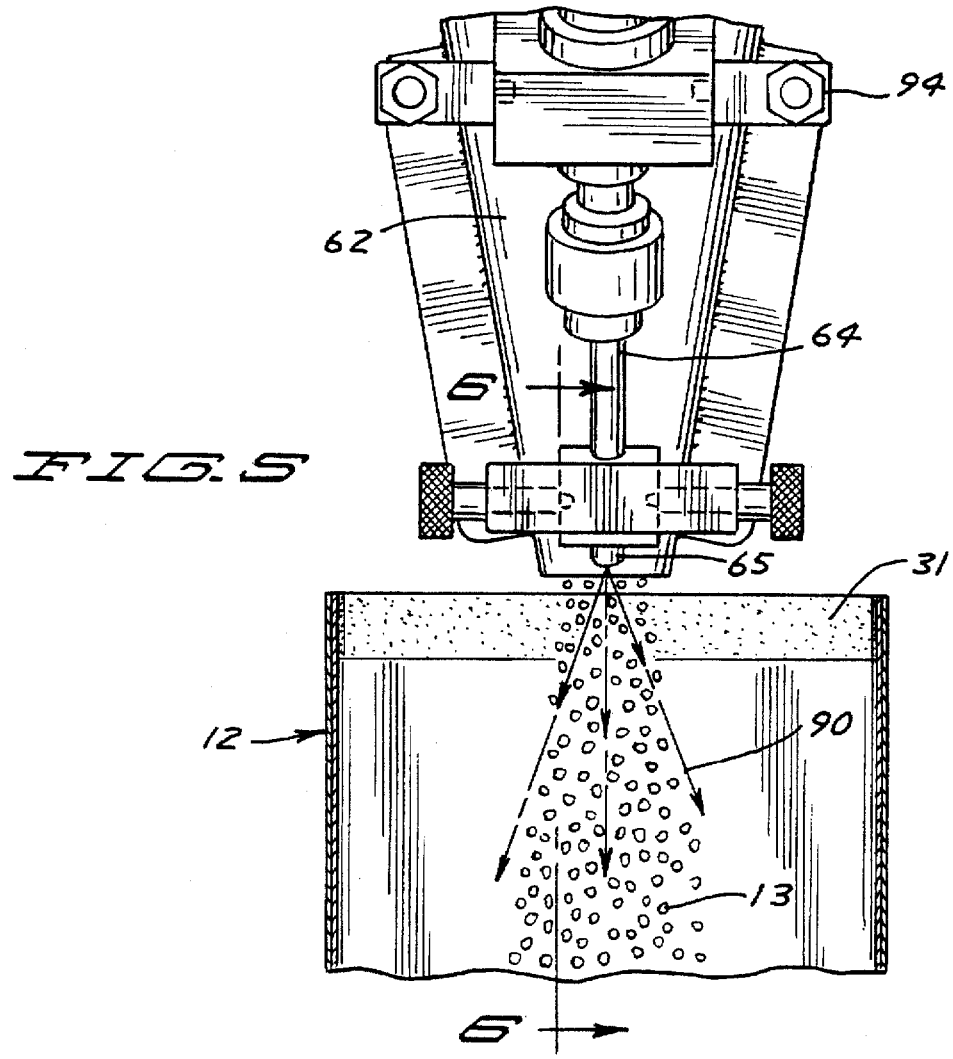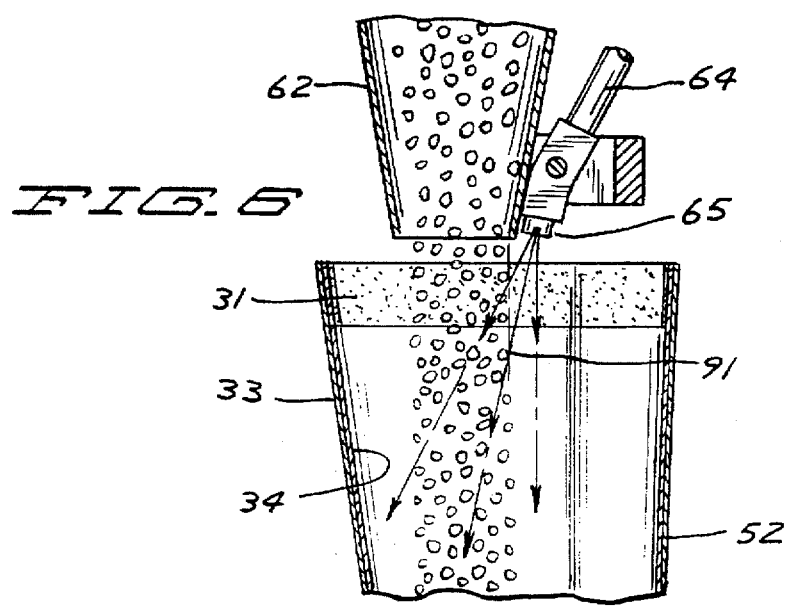

METHOD OF PREPARING REDUCED FAT MICROWAVE POPCORN

This is a division of application Ser. No. 08/086,607, filed Jul. 2, 1993, now abandoned.

THE TECHNICAL FIELD

The present invention relates to packaged food products. More particularly, the present invention relates to microwave popcorn product articles, to fat coated popcorn used therein and to methods for filling such articles.

BACKGROUND OF THE INVENTION

Popcorn is a highly popular snack food item. In the past, the at-home preparation of popcorn by the consumer involved adding kernel popcorn plus a cooking oil to a covered pot and heating until the popcorn kernels popped to make popcorn. As used herein, "kernel popcorn" refers to unpopped popcorn. The noun "popcorn" or synonymously "popped popcorn" refers herein to popped kernel popcorn. The adjective "popcorn" can refer to either.

More recently, microwave popcorn products have become extremely popular. At present, in the U.S., over 70 different brands of microwave popcorn products are available. In general, the more popular microwave popcorn products comprise an expandable paper bag containing a charge of kernel popcorn, fat and salt. The microwave popcorn article is adapted to be heated in a microwave oven for three to five minutes to produce the popped popcorn. More recently, improved microwave popcorn articles have been fabricated employing a metallized susceptor which facilitates the heating of the popcorn-fat charge and which, in turn, leads desirably to increases in popcorn volume and decreases in unpopped kernels. Microwave popcorn articles of this type are described in detail in, for example, U.S. Pat. No. 4,450,180 (issued May 22, 1984 to J. D. Watkins and incorporated herein by reference).

While extremely convenient and popular, microwave popcorn articles are not without certain disadvantages. Notwithstanding the wholesome and nutritious nature of popcorn per se, known microwave popcorn products typically are formulated with relatively high amounts of fat. Conventional full fat products generally contain about 25% to 35% fat. Since fats have more calories per gram than popcorn, it is not uncommon that more than 50% of the calories associated with the popcorn are derived from the fat. It is generally accepted that diets should be modified so as to significantly reduce the fat contribution to total caloric intake.

In view of the high fat content of conventional microwave popcorn and in light of health concerns, there have been formulated microwave popcorn products of reduced fat content. These products are manufactured in the same manner as full fat products but simply with less fat being added. Unfortunately, these products, upon preparation provide microwave popped popcorn that is organoleptically deficient in view of the perceivably reduced fat content. The present invention provides an improved product of reduced fat content by improving the fat perception by improving the evenness of the fat distribution. The improvement results from the present improved method of filling.

Some reduced fat products are about one half the fat of full fat product, some one third, some one fourth, etc. As the amount of fat is progressively reduced, the importance of the evenness of distribution of the little fat still employed progressively increases.

Microwave popcorn articles, of course, comprise a microwave popping bag and a charge of popcorn, fat, and, usually, salt. Certain early patents taught the addition of popcorn, fat and salt in the form of a prefabricated toroid or doughnut shaped piece. The piece was fabricated by mixing the popcorn, salt and melted fat to form a blend and the blend was allowed to cool and harden into the toroid shape desired. These circular pieces were then dropped into the desired chamber of the popcorn bag prior to final sealing. (See for example U.S. Pat. No. 4,450,180, issued May 22, 1984).

Contemporary methods of filling microwave popcorn bags, however, employ a different filling process and technique. (See, for example, U.S. Pat No. 4,604,854 entitled Machine For Forming, Filling and Sealing Bags, issued Aug. 12, 1986 to D. W. Andreas). The microwave bags having an unsealed open end are advanced to a first popcorn filling station. While being maintained in an open position, the popcorn is charged to the desired channel. Thereafter, the bags are advanced to the next station at which the fat/salt slurry is added to the bag. Typically, the slurry is added in the form of a vertically dispensed pencil jet (i.e., a confined stream) of the slurry. The bags now containing both popcorn and slurry are then advanced to a sealing station where the bags are provided with a top seal to complete the closure of the bag. The sealed popcorn bags are advanced to subsequent finish packaging operations which complete the folding of the bags, providing the bags with an overwrap, and inserting appropriate numbers of the bags into cartons, etc.

The contemporary method for filling popcorn bags involving the sequentially filling (i.e., not at the same time and station) of popcorn and then the slurry is well suited for those microwave popcorn products which can be characterized as "full fat" products. Such products typically have about 25% to 35% of fat. When such high fat amounts are used, the products have ample fat to provide the desired organoleptic attributes. The fat exists in sufficient quantities to more or less completely cover the popcorn and uniform distribution of the fat is not a concern.

While useful in connection with full fat microwave popcorn articles, there is a present need for reduced fat or low fat products comprising about 2% to 15% fat. When such low fat microwave products are prepared using the conventional sequential filling step process, there is an insufficient amount of fat to coat all the popcorn kernels. Upon microwave heating, a relatively few popped popcorn pieces can contain a disproportionate amount of the small amount of fat present. As a result, a large number of popped popcorn are perceived as being dry and thus organoleptically deficient.

Also, such low fat products do not have sufficient amounts of fat to bind the popcorn together in the disc form described in the '180 patent for simultaneous addition as thereon described. While other coating techniques might provide popcorn having small quantities of fat evenly coated therein as herein, the most difficult problem is how to handle the sticky fat-laden popcorn and fill uniform amounts thereof into microwave popcorn bags at high speed.

Given the state of the art as described, there is a continuing need for new and improved microwave popcorn articles of reduced fat content. Accordingly, it is an object of the present invention to provide new and improved microwave popcorn articles.

It is a further object of the present invention to provide a microwave popcorn article having a reduced fat charge, which upon microwave heating can provide popcorn of reduced fat content.

It is a further object of the present invention to provide microwave popcorn articles which upon microwave heating yield a popcorn of reduced fat content which nonetheless provides the organoleptically desirable attributes of higher fat content popcorns.

It is a further object of the present invention to provide microwave popcorn articles which upon microwave heating produce popcorn having fat distributions which are relatively more uniform than conventionally prepared low fat microwave popcorn.

It is a further object of the present invention to provide microwave popcorn packaged food products which upon microwave heating yields popped popcorn substantially free of popcorn pieces disproportionately high in absorbed fat.

Still another object of the present invention is to provide improved commercially practical filling methods for use in manufacturing microwave popcorn products of reduced fat content.

Another object of the present invention is to provide improved methods of filling microwave popcorn bags with popcorn and fat that improve the evenness of fat distribution over the popcorn.

Still another object is to provide a popcorn more evenly coated with reduced quantities of fat that upon microwave popping provide improved organoleptic properties.

Still another object is to provide microwave popcorn articles which upon microwave heating produce popcorn having relatively more uniform distribution of flavor, salt and/or color.

It has been surprisingly discovered that the above objectives can be realized and that superior microwave popcorn articles can be provided. In the preferred embodiment, the present invention resides in part in the simultaneous filling of popcorn and fat involving the spraying of fat/salt slurry at an angle to a falling cascade of popcorn as it is being charged to the upper open end of the microwave popcorn bag. The angle of the fat/salt spray is such as to intersect with the falling popcorn cascade within the popcorn bag below the top seal area. By applying the fat/salt slurry to a falling cascade of popcorn during bag filling improved distribution of the slurry over the popcorn is achieved. Such improved slurry distribution yields organoleptic improvements in the popped product in that fat perception is increased even at low fat levels.

BRIEF DESCRIPTION OF THE DRAWINGS

FIG. 1 is a diagramatic view of one method of filling a microwave popcorn bag in accordance with the invention.

FIG. 1A is a perspective view of an unsealed, folded microwave popcorn bag.

FIG. 2 is a plan sectional view taken along lines 2—2 of FIG. 1 with sealing jaws in retracted position shown in dotted relief.

FIG. 3 is an enlarged cross sectional view partially cut away of the popcorn and fat filling step taken along lines 3—3 of FIG. 1.

FIG. 5 is an enlarged sectional view partially broken away of the filling step taken along lines 5—5 of FIG. 4.

FIG. 6 is a sectional view taken along lines 6—6 of FIG. 5.

SUMMARY OF THE INVENTION

Figure 4:
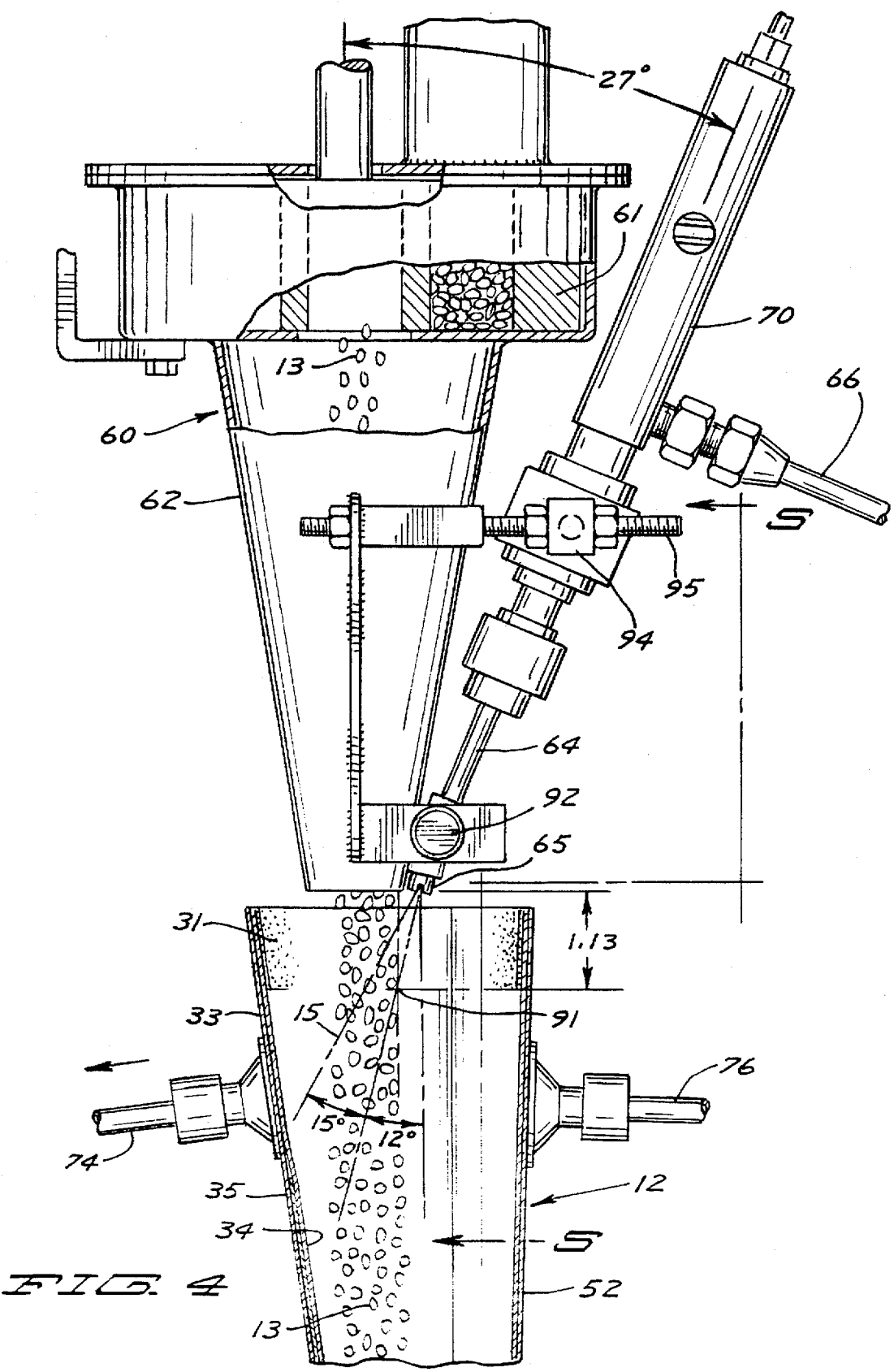
FIG. 4 is a greatly enlarged sectional view partially broken away of the filling step taken along lines 4—4 of FIG. 3.

In its article aspect, the present invention relates to improved microwave popcorn articles. The present microwave popcorn articles essentially comprise a microwave popcorn bag and a charge of kernel popcorn having reduced quantities of fat and salt more uniformly dispersed upon the popcorn. In the preferred embodiment, the popcorn charge is characterized by a low fat content reduced by 70% to 80% relative to a conventional full fat product. The kernel popcorn component essentially comprises about 90% to 98% of the charge. The fat component essentially comprises about 2% to 8% of the charge. The charge further comprises about 1% to 4% salt. The fat is distributed such that 80% to 90%+ of the popcorn kernels have at least 80% of their surface coated with the fat.

In its method aspect, the present invention resides in methods for filling a microwave popcorn bag with popcorn kernels coated with a fat and salt slurry having improved evenness of coating of the kernels with the fat and salt. The present methods comprise the steps of:

A. providing a microwave popcorn bag having a sealed bottom end and an open sealable top end defining a seal area in an open configuration and in a vertically aligned orientation;

B. filling the bag with a quantity of popcorn, fat and, salt, comprising the substeps of:
  1. dispensing popcorn kernels in an airborne stream by gravity in a falling cascade; and concurrently,
  2. spraying a quantity of a fat or fat and salt slurry into the airborne popcorn stream to coat the popcorn with the fat or slurry while airborne, said spraying being oriented to spray the slurry into the falling popcorn cascade and at an angle of about 8° to 15° relative to the stream to form an intersection between the slurry spray and the popcorn cascade said intersection being within the popcorn bag below the seal area; and C. sealing the open top end of the popcorn bag.

DETAILED DESCRIPTION OF THE INVENTION

The present invention relates to improved microwave popcorn articles of reduced fat content and improved volume and to their methods of preparation. The present microwave popcorn articles essentially comprise a microwave popcorn bag, a charge of a quantity of 1) popcorn, and 2) a quantity of a fat and/or fat/salt slurry uniformly dispersed upon the popcorn. Each of these article components as well as methods of filling, product use and attributes are described in detail below.

Throughout the specification and claims, percentages are by weight and temperatures in degrees Fahrenheit unless otherwise indicated.

Microwave Bag

The present microwave popcorn articles essentially comprise a conventional microwave popcorn popping bag. Useful herein for the microwave popping bag are a wide variety of microwave bags available commercially or known in the art. Useful microwave bags herein can include any conventionally useful bag for microwave popcorn products. For example, a suitable bag widely used commercially and preferred for use herein is described in the U.S. Pat. No. 4,450,180 patent which is incorporated herein by reference. A generally similar bag is described in U.S. Pat. No. 4,548,826. Generally, the bag comprises and is fabricated from a flexible sheet material having two collateral tubular sections. The sections are parallel longitudinally extending that communicate with each other at the center of the package.

Referring now briefly initially to FIG. 1A, there is shown an embodiment of a microwave popcorn article 10 composed of a microwave bag 12 formed from flexible sheet material such as paper and being of collateral tubular configuration, that is to say, being composed of a pair of parallel longitudinally extending tubes 14 and 16 which communicate with one another along a central longitudinal opening 18. The two parallel tubes 14 and 16 are separated by longitudinally extending side indentations 20 and 22. When the package comprises a paper bag, the bag can be composed of first and second face panels 24 and 26 respectively and the indentations 20 and 22 comprises gussets. The bag has bottom seal 28 and initially an open top or orifice 30 but a sealable seal area 31. After being filled, the top 30 is also sealed conventionally by means of heat or a suitable adhesive to provide a top seal in the top seal area 31.

The bag material is generally fabricated with multiple plies including an outer ply 33 which is generally paper, a grease-proof or resistant inner ply 34 (preferably grease proof) and microwave susceptor film member or ply 35 (see FIG. 4) intermediate these inner and outer paper layers. However, in preferred embodiments the microwave susceptor 35 is present only on one major face panel.

While tubes (or chambers, or channels) 14 and 16 can be of equal size, conventionally the susceptor channel 14 is generally slightly smaller. In such a configuration, the gussets include major left gusset face 36, minor left gusset face 37, major right gusset face 38 and minor right gusset face 39. The bag 12 can be provided with a lower transverse fold 40 to define an intermediate portion or pocket 41.

Although in the present description, a particular description is given to this preferred microwave bag, the present invention is also useful in connection with, for example, flat bottomed bags, bags with or without a bottom fold, with a straight bottom seal or other more complex bottom seal designs.

Popcorn

The present article 10 further essentially includes a quantity of kernel popcorn 13. Conventionally, microwave popcorn formulations are now expressed based upon the weight of the entire popcorn and fat charge. This convention is followed in the present description of the invention. Broadly, the popcorn can range from about 80% to 98% of the popcorn charge. Typically, about 80 to 90 g of popcorn is added to the bag, preferably about 80 to 85 g. In general practice, the amount of popcorn is set and the other ingredients are varied to provide reduced or low fat, and/or salted or no-salt embodiments. Thus expressed, in the preferred low fat embodiments of the present invention, the present microwave popcorn articles comprise a charge essentially comprising about 90% to 98% kernel popcorn (for non-salt embodiments, 97% for salted products), preferably 91% to 95%, and for best results about 93%. For less preferred, reduced fat embodiments the popcorn comprises about 80% to 87% popcorn.

Conventional kernel popcorn varieties can be used herein. Highly preferred for use herein are relatively larger kernel popcorn varieties. Preferred for use herein are those larger varieties having a kernel count of about 40 to 80 kernels per 10 g, preferably 50 to 65, which are commercially available.

Fat

The present articles additionally essentially comprises a quantity or charge of an edible fat designated generally by reference numeral 15. Generally, the present methods are useful in connection both with reduced-fat and with low-fat embodiments. As noted, the present invention finds particular suitability for use in connection with low-fat microwave products. Low fat products have an even lower fat content than reduced fat embodiments. Reduced fat products have a fat content of about 8% to 15% fat. All fat percentages are descriptive of added fat and are not meant to include fat which may be included in the finished product from other ingredients, e.g., the fat from the popcorn. Thus, broadly, the fat can range from about 2% to 15% and about 8% to 15%, (preferably 10% to 14%) for reduced fat embodiments. In the preferred low fat embodiments the charge essentially comprises about 2% to 8% fat, preferably 3% to 4% fat and for best results about 3.5%.

The fat, preferably semi-solid or solid fat, can be from any conventional, suitable fat(s) or oil(s) or mixtures thereof from vegetable or animal sources including from soybean, cottonseed, safflower, corn, peanut oil(s), butter oil and mixtures thereof. The oils can be partially hydrogenated. Preferred for use herein are fats which are partially hydrogenated soybean and/or corn oil. Also useful herein are tropical oils such as coconut oil and palm kernel oil, although present consumer trends disfavor utilization of such oils.

Microwave popcorn articles additionally conventionally comprise salt in the popcorn/fat charge. However, certain line extensions of popular microwave popcorn brands include no-salt or low salt embodiments. In those salt bearing articles, the salt is simply physically admixed in with the fat component to form a fat and salt "slurry." The term slurry is used herein as is common in the microwave popcorn art to refer to any coating applied to the popcorn. The term "slurry" as used generally herein thus includes fat alone; fat and salt; fat, salt, flavors and/or color or sweetener (s); as well as any other variation or combination of ingredients used as an addition to the popcorn herein.

The slurry can additionally optionally comprise minor amounts of other materials conventionally employed to make the microwave popcorn more aesthetically or nutritionally or organoleptically appealing. Such adjuvant ingredients can include, for example, sugar(s), minerals, vitamins, colorants, preservatives and flavors. If present, each of these constituents can comprise from about 0.01% to about 2% (or more for sugar, cheese solids) by weight of the fat slurry. Especially popular for use herein is a butter flavor. The flavors can be either in liquid, fat soluble forms and/or in dry powder forms such as a liquid oil absorbed onto a particulate carrier, e.g., gum arabic, starch, silicon dioxide, or dehydrated cheese solids.

In those salt containing embodiments herein, the charge additionally essentially comprises about 1% to 5% salt, preferably about 2% to 4% and for best results about 2.5%. Of course, both salt free reduced fat and salt free low fat embodiments are contemplated herein as well.

The fat with the salt dispersed therein is prepared simply by admixing the fat (in a fluid or melted state) together with any optional ingredients with salt and blending the mixture to form a stable dispersion or slurry. The fat or slurry, while still warm (114° to 130° F.; 45° to 55° C.), is then sprayed onto the popcorn while filling the bag as described in detail below.

Method of Preparation

Now referring to FIG. 1, there is seen a schematic of the method of preparation preferred for use herein generally designated by reference numeral 50. The drawing shows a conventional microwave packaging line and depicts three stations thereof designated generally by reference numbers 52, 53 and 54. In upstream stations, (not shown) the tubular bag material is cut into desired lengths, and is provided with the bottom seal 28. Additionally, in upstream stations, the bags 12 are folded to have their bottom third folded up as depicted in first station 51 of FIG. 1 to provide the first lower transverse fold 40 so that the popcorn and fat charge can be positioned within the bag in the desired middle portion 41 thereof. The bags 12 are advanced from station to station (left to right) by suitable drive means such as the endless drive chain 54 depicted having bag engagement clips 55. Packaging line speeds range from about 50 to 100 bags per minute. Also, the bottom third of the bags are maintained in the closed position by appropriately spaced parallel guide bars 56 and 58.

In the conventional method of filling microwave popcorn bags, the first station 51 would be a popcorn filling station. The fat and salt addition would be charged to the bag at a second separate station. However, as illustrated, in the present method of filling popcorn bags, the popcorn filling and fat addition are performed at the same time and at the same station rather than in sequential separate steps.

Thereafter, the bags being maintained in the upright, folded orientation depicted in FIG. 1 are advanced to the popcorn and fat filling station 52. The bag 12 is then filled as described in detail below.

Once filled, the bags are then advanced to the third sealing station 53 wherein the top orifice 30 is sealed such as by retractable heat sealing jaws 82 which impart a seal in the heat seal area. Also at the third station can be an upper set of parallel guide bars 84 which causes the bags to close for top sealing. The filled and sealed microwave popcorn bags are then advanced to subsequent downstream packaging operations (not shown). Such subsequent downstream packaging operations include folding the bags again to provide a three-folded bag, i.e., to provide a second upper transverse fold, overwrapping the folded bags with an overwrap or moisture barrier layer, and inserting desired numbers of the packaged article into cartons.

As depicted in FIG. 1, the filling station 52 can employ a popcorn dispensing and fat spray apparatus 60. Generally, however, the filling station 52 includes a means for dispensing a measured quantity of popcorn such as the dispensing wheel 61 depicted. The dispensing wheel 61 discharges at timed intervals a measured quantity (e.g., 80 to 90 g) of the popcorn into a vertically oriented filling horn or funnel 62. The funnel 62 causes the popcorn to fall by gravity in the form of an airborne stream or cascade of a defined width or diameter suitable for the size of the bag's orifice, e.g., cylindrical. The apparatus 60 further includes an applicator 64 for spraying the fat/salt slurry 13 (e.g., commercially available from Hibar Systems Limited, Ontario, Canada) that is supplied by slurry supply means 66. The slurry supply means 66 includes a conventional positive displacement reciprocating metering pump 68 having a piston 70 and a pressurized slurry inlet 72. The pump 68 precisely pumps metered amounts of the fat/salt slurry to the applicator 64 at closely controllable time intervals.

Still referring to FIG. 1, the filling station 52 is further provided with a means for opening the popcorn bag 12 for filling which essentially includes at least one and preferably a pair of reciprocating suction cups 74 and 76. Suction cups 74 and 76 engage the first and second face panels 24 and 26 to open the bag 12. In highly preferred embodiments, the bag opening means additionally includes a means for opening the bag such as an opposed pair of air jets 78 and 80 or other mechanical bag opening devices directed towards panels 36 and 38 to facilitate opening of the popcorn bag for filling. Air jets 78 and 80 are cycled to be directed against gusset faces 36 and 38 respectively so as to cause the bag to open to allow more easily the dispensing of the popcorn and fat into tube 14 as depicted in FIG. 5.

FIG. 1 further depicts at the third station 43 a means for closing the filled bag such as closure bars and a means for top sealing the now filled popcorn bags such as the set 82 of retractable electrically operated heat sealing jaws.

Reference is now made again to FIG. 2. Initially, the bag 12 at the first station 51 is maintained in a closed vertically aligned position. FIG. 2 also shows better that the bag 12 is opened by suction cups 78 and 79 which engage panels 26 and 24 respectively and pull the bag open as the cups retract in the opposite direction indicated. The filling spout or funnel 62 is positioned immediately above the bag such that its bottom end is aligned with the upper open end of the small tube with just enough clearance to insure smooth operation. FIG. 2 further shows at the third station 53 the retractable movement of heat seal jaws 82.

The cross sectional profile of the falling popcorn cascade is shown in dotted relief as 86.

Reference is now made briefly to FIG. 5. In FIG. 5, it can be seen that the slurry is dispensed in the preferred embodiment in the form of a fan-type spray 90. Such a fan spray application is obtained by providing the applicator 64 with a spray nozzle tip 65. Generally, a spray nozzle that provides a fan type spray pattern is selected so as to disperse the fat or fat/salt slurry with a fan width equal to the diameter or width of the falling popcorn cascade at their line of intersection. In the preferred embodiment a 65° fan nozzle tip 65 is used having a 2 gal/min rating (7/64" opening). The 65° distribution angle specification, of course, is for a water spray. Since the fat/salt slurry has viscosity characteristics different from water, the actual angle of the slurry spray is modestly less than the full 65° distribution angle achieved by water. In actual practice the fan nozzle angle 65 specification can range from 40° to 75°, preferably about 45° to 65°, and for best results about 65°. FIG. 5 further shows that the funnel axis and the applicator axis are aligned to be in the same plane so that their respective product streams' direction or vector are correspondingly coplanar.

While a fan spray is preferred for use herein, equivalents thereof in terms of dispensing the slurry across the popcorn stream can also be used. For example, a multiplicity of very fine jet streams, e.g., 3–12, or a sparge can be used to achieve the desired dispersion hereunder. Also, other spray types, (e.g., a cone spray, or a mist spray) are useful herein, especially when used within the funnel. However, great care must be taken in selecting such useful alternatives so as to avoid getting slurry in the bag seal area. In other embodiments, the spray can be gas assisted, e.g., air, steam, or inert gas.

Reference now is made to FIG. 4 which shows that the intersection 91 of the falling popcorn cascade 88 with the fat spray is importantly below the upper seal area 31. It is important to avoid the inadvertent spotting of the fat in the seal area 31 since the presence of fat in the seal area adversely affects the integrity of the seal in the later sealing step. Even minor gaps in the seal can greatly adversely affect the performance of the microwave popcorn bag upon microwave popping. Gaps in the seal can lead to steam loss which in turn can lead undesirably to reductions in popped corn volume or premature venting. Such a concern about avoiding the inadvertent deposition of minor amounts of fat in the seal area is not a problem in the conventional method of microwave popcorn bag filling since the conventional practice is to dispense the fat in a thin pencil jet in a downward vertical direction (e.g., about 0.2 mm in diameter).

Still referring to FIG. 4, it is seen that in the most preferred embodiment the angle of the slurry is at an angle of about 8° to 15° from vertical, preferably about 12° from vertical. Such a slight angle is desirable so as to cause the fan spray of slurry to intersect with the downwardly directed falling popcorn cascade. The angle is also important to achieving the desired intersection of the slurry with the popcorn within the microwave popcorn bag, importantly below the upper seal area. The angle is adjustable by the lateral movement of the applicator 64 about pivot pin 92 as position nut 94 is secured to threaded rod 95. The fat or slurry discharge and popcorn fall are timed to coincide while the popcorn falls. More particularly, the slurry shots must be timed such that they intersect with the beginning of the popcorn charge and continue through the end of the popcorn charge from bottom to the top of the popcorn cascade. The continuous intersection of slurry and popcorn throughout the charge is important to ensure a uniform distribution of the slurry.

In preferred embodiments, the bag 12 has a microwave chamber (i.e., wherein one major face panel has an intermediate microwave susceptor layer between the inner and outer bag layers) and, for cost considerations, a microwave susceptor-free chamber. In the preferred practice, the popcorn fat and salt are charged to the microwave channel. Conventionally, the microwave panel is the lesser channel (i.e., being formed by the smaller major face 24) and the greater channel is the microwave free channel. Such a configuration minimizes the amount of relatively expensive microwave susceptor material required while nonetheless providing the needed expansion volume upon microwave popping.

By selecting a fan-type of spray and by orienting the spray at a small angle relative to vertical, an intimate mixing of the slurry with the popcorn is achieved while the popcorn is still falling. The mixing and tumbling action of the popcorn and the slurry while still falling surprisingly achieves a highly uniform distribution of the fat over substantially all of the popcorn surface area.

The popcorn and fat mixture obtained by the methods of the present invention is thus importantly characterized by the fat being uniformly dispersed over the surface of the popcorn. More specifically, in the present invention, the present popcorn and the microwave popcorn articles containing such popcorn are essentially characterized by at least 80% (preferably 90%) of the popcorn kernels having substantially all (at least 80%) of their surface area coated by the popcorn. In contrast, using conventional filling techniques (e.g., a thin pencil jet of slurry) at equivalent popcorn and fat usage levels, fewer than 75% of the popcorn kernels have substantially all of their exterior surface coated with the fat. Otherwise stated, there is a substantial reduction (from about 25% to less than 10%) in the number of popcorn kernels that are not substantially completely covered by fat. This increase in the uniformity of fat distribution surprisingly disproportionately leads to an increase in the perception of fat. Such a result is highly desirable in such low fat embodiments containing such modest levels of fat.

Another aspect of the present invention is that the fat is preferably applied to the popcorn outside of the funnel 62. While less preferred, it is possible to apply the fat or slurry in the form of at least one fan spray to the popcorn as the popcorn is falling through the funnel and achieve the benefits of the present invention. In those embodiments, the angle of the spray can range from 0° to 180°, preferably 0° to 90°, and more preferably >60° relative to the popcorn stream. For example, the application can be positioned to be parallel to and preferably concentric with the popcorn stream (i.e., 0° angle relative to the popcorn stream). In another variation, the spray can be through a hole in the funnel into its interior. The spray can be at 90° to the popcorn stream or at an acute angle thereto. However, it has been discovered that the preferred practice herein of applying the spray of slurry to the popcorn outside of the funnel leads unexpectedly to desirable increases in filling speeds.

The skilled artisan will appreciate that the cycle time of the bag in the popcorn and fat filling station is very brief. At line speeds of 60 bags per minute, the entire filling cycle is on the order of one second. Of course, at higher line speeds, the cycle time must correspondingly be less. When the slurry is charged to the popcorn within or above the filling funnel, the coated popcorn tends to be momentarily held up in the funnel. While the duration of the impediment is extremely brief, it is of sufficient duration so as to reduce achievable line speeds substantially. Thus, it is an advantage of the present invention that by applying the slurry in the present preferred manner, (i.e., exterior to the funnel) unexpected increases in line speeds are obtained. Additionally, applying the spray within the funnel, if unheated, can lead to fat build up therein which requires more frequent cleaning. In those embodiments wherein the spray is applied within the funnel, it is preferable to heat the funnel, more preferably to above the melting point of the fat. Such heating can be done by warm air or by electrical heating tape applied to the funnel exterior.

It will be appreciated that another advantage of the present method is that the popcorn is uniformly dispersed with the fat without the presence of any additional coating material such as a film material that might tend to interfere with the popcorn puffing performance or the popped product's organoleptic attributes.

As mentioned briefly above, the present invention broadly resides in the provision of a microwave popcorn article which upon microwave heating provides microwave popped popcorn having three principal advantages. First, the popped popcorn has a reduced fat content but nonetheless exhibits the perceived organoleptic attributes of higher fat content popcorns. Second, the fat distribution is superior, notwithstanding the reduction in fat content. Moreover, the popped popcorn exhibits better flavor and appearance.

While not wishing to be bound by the proposed theory, the present invention resides in part in the appreciation that in the microwave preparation of popcorn, the fat upon heating initially liquefies and tends to collect at the bottom of the microwave bag. As microwave heating continues, some kernels pop first. Surprisingly, these popped kernels appear to disproportionately absorb the liquefied oil. As a result, relatively less oil is available to coat and flavor the remaining popcorn pieces. Thus, the finished popped popcorn is characterized by a relatively few number of popcorn pieces having relatively large amounts of fat with the vast majority of the popcorn pieces having much less. Indeed, it has been speculated herein that about 3% to 5% of the popcorn pieces believed to be the initially popped pieces can contain up to 40% of the overall fat.

Surprisingly, it was discovered that the initial undesirable excessive fat absorption by earlier popped pieces could be minimized or substantially reduced by providing the fat more evenly distributed upon the popcorn. Provision of such a more evenly distributed fat thereby avoids pooling of the fat in the bag bottom which in turn desirably avoided the excessive initial fat absorption by the early popped pieces.

The avoidance of excessive initial fat absorption allows for a substantial reduction in overall fat content to be achieved without sacrificing desirable organoleptic attributes. However, the more even distribution of the then reduced fat content allows even further reductions in overall fat content without sacrificing organoleptic attributes.

It was surprisingly discovered that such a fat component could be provided by spraying the slurry into a falling cascade of popcorn while the popcorn is being charged to the microwave popcorn bag.

Furthermore, in those embodiments wherein the charge additionally includes added flavor, e.g., supplemental butter flavor, or seasonings, the present invention provides an added benefit; namely, superior distribution of the added flavor, salt and color.

Product Use

The microwave popcorn products prepared as described can be used in a conventional manner for the at-home preparation of popcorn by microwave heating. Upon microwave heating, the popcorn exhibits more uniform coating of the fat and salt, more uniform fat distribution, excellent organoleptic attributes, and in the preferred low fat embodiments, a reduced fat content.

Industrial Activity

The present invention finds suitability for use in the provision of a mass market, shelf stable consumer food item adapted to prepare oiled, flavored popcorn upon microwave heating.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the microwave popcorn art, can be undertaken without departing from the spirit and scope of the invention.

EXAMPLE 1

An improved microwave popcorn article of the present invention comprising a microwave popcorn bag was prepared having the popcorn/fat charge of the composition indicated below. The microwave popcorn bag is fabricated substantially in accordance with the teachings of U.S Pat. No. 4,450,180. Microwave popcorn articles comprising microwave popcorn bags of this type are available under the brand name Betty Crocker™/Pop Secret™. The popcorn fat charge had the following composition:

| Ingredients | Weight % |
| --- | --- |
| Popcorn | 93.8 |
| Fat[1] | 3.3 |
| Salt | 2.8 |
| Artificial butter flavor | 0.1 |
| | 100.0% |

[1]An hydrogenated soybean oil available from Honey Mead Products Co. under the trade name HM608.

A supply of the fat and salt were prepared to form a warm slurry (about 122° F.; 50° C.).

A quantity of microwave popcorn bags were filled as follows:

About 82.6 g of popcorn was dispensed by the dispensing wheel into the funnel. The applicator was timed to dispense about 5.5 g of the slurry as the popcorn cascade exits the bottom of the filling funnel to disperse the slurry in the form of a fan spray. The duration of the spray was about 0.5 seconds. The slurry intersected the popcorn within the microwave popcorn bag below the seal area. The bags were then heat sealed to form finished, low fat microwave popcorn articles of the present invention.

Disposed within the articles were slurry coated popcorn of the present invention.

A number (50) of microwave popcorn articles were opened to test for evenness of the slurry in coating the popcorn. The bags were opened and the popcorn removed for testing. The fat coated popcorn was then stained with a lipophobic dye. The stained fat coated popcorn was then visually examined for extent of coverage.

The results of such testing was that about 92% of the individual popcorn kernels had at least 90% coverage by the fat.

The results of such testing indicate that the methods of the present invention were surprisingly effective in evenly distributing minor amounts of fat on the popcorn.

What is claimed is:

1. A method for filling a microwave popcorn bag with unpopped popcorn kernels coated with a fat or fat/salt slurry evenly dispersed thereon having improved evenness of coating of the kernels with the fat, comprising the steps of:
   A. providing a microwave popcorn (12) having a sealed bottom end (28), an open sealable top end (30) defining an upper orifice and a transversely extending seal area (31) in an open configuration and in a vertically aligned orientation;
   B. filling the bag with a quantity of unpopped popcorn kernels (13), and slurry (15) comprising the substeps of:
      1. dispensing a quantity of unpopped popcorn kernels in an airborne stream; and concurrently
      2. spraying a quantity of a fat or fat/salt slurry into the airborne popcorn stream to coat the popcorn kernels with the slurry as the popcorn kernels are charged into the bag, wherein the slurry is fluid and has a temperature ranging from about 114° to 130° F., and wherein the weight ratio of popcorn kernels to slurry ranges from about 5 to 30:1; and
   C. sealing the open top end of the popcorn bag (12).

2. The method of claim 1
   wherein the spray is oriented to spray the slurry in the direction of and into the airborne popcorn stream and at an angle of about 0° to 90° relative to the popcorn stream to form an intersection between the spray and the popcorn stream.

3. The method of claim 2
   wherein the popcorn is dispensed in the form of a cylindrical cascade defining a stream diameter;
   wherein said bag is formed of a flexible tubular sheet material having a sealed bottom and an open sealable upper end; and
   wherein the spray angle ranges from about 8° to 15°, and said intersection is within the popcorn bag (12) below the seal area (30).

4. The method of claim 3
   wherein the spray is in the form of a fan spray having a width at the intersection equal to the diameter of the popcorn cascade and wherein the cascade falls vertically into the bag.

5. The method of claim 4
   wherein the fat or slurry has a spray temperature of between about 114° to 130° F. (45° to 54.5° C.) and the fat is a material selected from the group consisting of low melting point fats, partially hydrogenated oils, fluid fats, and mixtures thereof.

6. The method of claim 5
   wherein the popcorn quantity ranges from about 80% to 97%;

wherein the fat quantity ranges from about 2% to 15%; and wherein the spray additionally includes about 1% to 4% of salt.

7. The method of claim 6 wherein the bag has first and second major rectangular face panels each having parallel transversely extending top and bottom edges and parallel vertically extending side edges and sections of interconnecting folded gusset material projecting centrally between the side edges of the face panels with the centrally projecting gussets approaching each other enough to divide the bag into first and second collateral tubes; and wherein the popcorn and fat or slurry are charged to only one collateral tube.

8. The method of claim 7 wherein the bag includes a lower transverse fold defining an intermediate tube portion and the bag is maintained with the lower fold portion folded against the bag body; and wherein the first collateral tube has a microwave susceptor layer defining a microwave collateral tube.

9. The method of claim 8 wherein the slurry is applied entirely to the cascade from bottom to top.

10. The method of claim 9 wherein the first major face panel is smaller in width than the second major face panel defining a minor microwave susceptor collateral tube and a major susceptor-free collateral tube; and wherein the angle ranges from about 8° to 15°.

11. A method for filling a microwave popcorn bag with unpopped popcorn kernels coated with a fat and salt slurry having improved evenness of coating of the kernels with the fat and salt, comprising the steps of:

A. providing a microwave popcorn bag having a sealed bottom end and an open sealable top end defining an upper orifice;

B. advancing the bag to below a fill station means for dispensing unpopped popcorn kernels in a falling cylindrical cascade, and a means for spraying an edible fat and salt slurry, said spraying means being oriented to spray the slurry into the falling popcorn cascade and at an angle of about 0° to 15° relative to the cascade to form an intersection between the fat and slurry spray and the popcorn cascade;

C. opening the microwave bag to have its upper orifice in an open configuration and to have a vertically aligned orientation;

D. dispensing a quantity of unpopped popcorn kernels to fall in a cascade into the open bag upper orifice and concurrently spraying a quantity of fat and slurry into the falling popcorn cascade to coat the unpopped popcorn kernels with the fat and slurry while falling wherein the intersection between the cascade and the spray is within the bag;

E. closing the microwave bag; and

F. sealing the open end of the popcorn bag.

12. The method of claim 11 wherein the popcorn is dispensed from a cylindrical filling tube, funnel or filling horn with a circular dispensing hole to form a cylindrical cascade.

13. The method of claim 12 wherein said bag is formed of a flexible tubular sheet material having a sealed bottom and an open sealable upper end.

14. The method of claim 13 wherein the fat and slurry is sprayed in the form of a horizontally oriented fan spray having a width at said intersection equal to the diameter of the popcorn cascade.

15. The method of claim 14 wherein the slurry has a temperature of between about 115° to 130° F. and includes a fat material selected from the group consisting of low melting point fats, partially hydrogenated oils, fluid fats, and mixtures thereof.

16. The method of claim 15 wherein the popcorn quantity ranges from about 90% to 97%, wherein the fat quantity ranges from about 2% to 5%, and wherein the salt quantity ranges from about 1% to 4%.

17. The method of claim 16 wherein the bag is maintained in an open position by suction pulling apart the first and second major face panels.

18. The method of claim 17 wherein the bag has first and second major rectangular face panels each having parallel transversely extending top and bottom edges and parallel vertically extending side edges and sections of interconnecting folded gusset material projecting centrally between the side edges of the face panels with the centrally projecting gussets approaching each other enough to divide the bag into first and second collateral tubes, and wherein the popcorn and slurry are charged to only one collateral tube.

19. The method of claim 18 wherein the first collateral tube has a microwave susceptor layer defining a microwave collateral tube.

20. The method of claim 19 wherein the first major face panel is smaller in width than the second major face panel defining a minor microwave susceptor collateral tube and a major susceptor-free collateral tube.

21. The method of claim 20 wherein Step C includes the substep of directing at least one air jet against a gusset face panel of the bag.

22. The method of claim 19 wherein the first and second tubes are of equal size.

* * * * *